(12) United States Patent
Plüss et al.

(10) Patent No.: US 9,064,365 B2
(45) Date of Patent: Jun. 23, 2015

(54) AUTHENTICATION SYSTEM

(75) Inventors: Marcel Plüss, Tann (CH); Klaus Ulrich Klosa, Grüningen (CH); Urs Andrin Lampe, Zollikon (CH)

(73) Assignee: LEGIC IDENTSYSTEMS AG (CH)

( * ) Notice: Subject to any disclaimer, the term of this patent is extended or adjusted under 35 U.S.C. 154(b) by 1417 days.

(21) Appl. No.: 12/520,346

(22) PCT Filed: Dec. 21, 2007

(86) PCT No.: PCT/EP2007/064519
§ 371 (c)(1),
(2), (4) Date: Jul. 31, 2009

(87) PCT Pub. No.: WO2008/080909
PCT Pub. Date: Jul. 10, 2008

(65) Prior Publication Data
US 2009/0314831 A1 Dec. 24, 2009

(30) Foreign Application Priority Data

Dec. 29, 2006 (EP) .................................... 06127381

(51) Int. Cl.
*G06F 17/00* (2006.01)
*G06K 5/00* (2006.01)
*G06K 19/00* (2006.01)
*G06K 19/06* (2006.01)
*G07F 7/10* (2006.01)
*G06Q 20/34* (2012.01)

(52) U.S. Cl.
CPC ............ *G07F 7/1008* (2013.01); *G06Q 20/341* (2013.01); *G06Q 20/355* (2013.01); *G06Q 20/3552* (2013.01)

(58) Field of Classification Search
USPC ........ 235/375–382, 487, 492, 493; 725/2, 17, 725/20; 726/2, 4–5, 9, 20; 340/5.2, 5.8, 340/10.52, 572.1–572.8; 705/65, 73
See application file for complete search history.

(56) References Cited

U.S. PATENT DOCUMENTS

| 4,542,465 | A  | * | 9/1985 | Stockburger et al. ......... 700/117 |
| 4,709,136 | A  |   | 11/1987 | Watanabe |
| 4,855,578 | A  |   | 8/1989 | Hirokawa et al. |
| 4,912,310 | A  | * | 3/1990 | Uemura et al. ............... 235/380 |
| 6,385,597 | B1 | * | 5/2002 | Guenther et al. ............. 705/410 |
| 6,729,549 | B2 |   | 5/2004 | Hamann et al. |
| 2007/0132548 | A1 | * | 6/2007 | Baraz et al. ................... 340/5.6 |

FOREIGN PATENT DOCUMENTS

| EP | 1389752 | 2/2004 |
| FR | 2 638 002 A | 4/1990 |
| WO | WO 82/01610 A | 5/1982 |

(Continued)

OTHER PUBLICATIONS

International Search Report dated Apr. 24, 2008, issued in corresponding international application No. PCT/EP2007/064519.

*Primary Examiner* — Michael G Lee
*Assistant Examiner* — Laura Gudorf
(74) *Attorney, Agent, or Firm* — Ostrolenk Faber LLP

(57) ABSTRACT

The invention is directed to an authentication system comprising a reader and a first and a second authentication media and a meta authentication media foreseen as a carrier between different authentication media and the reader.

15 Claims, 6 Drawing Sheets

(56) References Cited

FOREIGN PATENT DOCUMENTS

| WO | WO 97/34265 A1 | 9/1997 |
| WO | WO 01/41087 A1 | 6/2001 |
| WO | WO 01/54086 A | 7/2001 |
| WO | WO 2005/059723 A1 | 6/2005 |

* cited by examiner

AUTHENTICATION SYSTEM

CROSS REFERENCE TO RELATED APPLICATIONS

The present application is a 35 U.S.C. §371 National Phase conversion of PCT/EP2007/065905, filed Dec. 21, 2007, which claims benefit of European Application No. 06127381.9, filed Dec. 29, 2006, the disclosure of which is incorporated herein by reference. The PCT International Application was published in the English language.

BACKGROUND

1. Field of the Disclosure

The invention lays in the field of authentication systems as defined in the preamble of the claims.

2. Related Art

From the prior art electronic authentication media, e.g. in the form of a smart card or build in a key are known. These authentication media in general comprise an interface to communicate with a read write unit (from now on reader) and a memory means to store authentication data. The authentication media may further comprise a memory to hold application data, e.g. information about credits for a certain application, and a microprocessor or logic to process authentication, application or other data.

From the same applicant as of this patent application a hierarchical authentication system is known by which the making of different authentication media is possible by the use of a reader and at least one master authentication media comprising master authentication data. In a first step at least one authentication rule is stored in the reader in that the reader is interconnected to a programming unit, e.g. a Personal Computer (PC) acting as a host.

WO97/34265 of the applicant discloses a system with different media and read write units associated with the media. The system is directed to a hierarchical authorization system with system or authorization rules defining the belonging to the systems and maintaining its integrity. Within the system, a media (as a slave) has to be generated and/or initialized by means of an authorization media (as the master) and a authorization read write unit. An identification media may be initialized with several applications from independent application providers respectively users. Each application is identifiable by a stamp representing the hierarchical level of the authorization system and the independent user. The system further allows to launch associated read write units by initializing said read write unit with launch data by means of a special launch media. The launch data define to what extent a read write unit is allowed to process a media corresponding to said launch data respectively with a corresponding stamp.

WO01/41087 of Orga Kartensystem GmbH discloses a method for the initialization or personalization of smart cards. To increase the throughput of an initialization or personalization device a first initialization data set corresponding to a first function for a first smart card is transferred from a host into the memory of the initialization or personalization device and store therein. Afterwards the first initialization data set can by used to initialize a second smart card with the first function using the first initialization data set. The method allows to initialize a plurality of smart cards with the first function without the need for a repetitive transfer of the first initialization data set from the host to the initialization or personalization device when initializing said plurality of smart cards.

U.S. Pat. No. 6,729,549B2 of International Business Machines Corporation (IBM) discloses a method for the personalization of smart cards based on virtual smart cards containing all data objects required to personalize said (real) smart cards. The logical file structure and the data objects of the virtual smart cards are being generated at a first site by a control program. The control program handles, defines or controls the security features of the smart cards and enables a secure data exchange with a personalization program at a second site. By means of the personalization program, smart cards pre-initialized with the same logical file structure as the virtual smart cards are personalized with the data objects defined for the corresponding or associated virtual smart cads.

WO2005/059723A1 of Motorola Inc. discloses a method of programming a second security token (security medium) holding a second set of privileges (rights) using data of a first set of privileges stored in a first security token without the necessity to involve a third party. When presenting the first security token to a device for programming security tokens, privileges derived from the first set of privileges, e.g. a sub-set or new user privileges, are presented to the user of the first security token. Out of said privileges, the user selects the second set of privileges to be assigned to the second security token and to be programmed by said device.

EP1389752A2 of Activcard Ireland Limited discloses a system for privilege (right) delegation from a first security token (security medium) with privileges and associated control attributes to a data processing unit, e.g. a second security token or a computer. The data processing unit has the ability to store and use the delegated privileges to perform data exchange with the first security token and/or a second data processing unit. The attributes associated with the privileges handled respectively executed by the data processing unit define how to configure the delegated privileges, including adherence to security policies or privilege splitting.

U.S. Pat. No. 4,709,136 of Toppan Moore Company, Ltd., shows a smart card reader with two contactors for smart cards. The access to the content of the smart cards is allowed only when two smart cards are inserted into the contactors and verification or comparison of the codes or other privileges of the two smart cards result in coincidence.

There are also authentication media known which allow to store on the level of a user different authentication data and/or application data within the same authentication media. E.g. in a company an authentication media is handed out to each employee (user) allowing access to one or several restricted areas based on one or several set of specific authentication data stored on the authentication media. The authentication media may store further application data on user level, e.g. regarding working hours or credit information for the coffee machine and the cafeteria. A further example is an application where several parties would like to offer a personalized authentication media. E.g. in a ski resort different application providers such as hotels, the operator of the local ski lifts, the operator of the local railway and the operator of the indoor swimming pool would like to bring out (personalize) in collaboration with the tourist office a personalized tourist card in form of an authentication media for the guests of the ski resort such that the guests can utilize the available facilities by the authentication media in a simplified manner. The authentication media therefore are in general capable to store different set of authentication data and/or different set of credit information and/or different set of personal data.

The making of authentication media for certain applications is relatively cumbersome due to the reason that for the making of the authentication media all different systems of the providers have to be interconnected to each other at the same time such that the information (e.g. different application data, authentication rules) can be stored simultaneously. Therefore an independent and effective making of an authentication media is not possible.

Authentication systems as known of the prior art often suffer the disadvantage that their operability is cumbersome to achieve a sufficient level of security or they are relatively easily to defeat but bear significant security problems, e.g. due to a wire connection between a reader and a host which can be relatively easily be eavesdropped. A further disadvantage consists in that authentication systems known from prior art are often difficult to install because a lot of wiring is necessary.

SUMMARY

An object of the invention is to simplify the making (initialization, personalization) of authentication media, especially authentication media for different applications. A further object of the invention is to detach the making of an authentication media from a specific system. A further object of the invention is to simplify the repeated making of a same authentication media. A further object of the invention is to simplify embedding or integration of a reader into a authentication system for different applications. A further object of the invention is improve the overall security level.

These objects are solved by the invention as defined in the claims.

An embodiment of the invention is directed to an authentication system comprising a reader (read write unit) with at least one interface to exchange meta information with different authentication media. The reader comprises or is interconnected to a logic to process meta information exchanged with different authentication media whereby the meta information is foreseen to operate the logic of the reader and/or to be exchanged with at least one other authentication media of the same or a different kind.

In an embodiment of an authentication system according to the present invention it is foreseen to operate a chain of authentication media of different kind and functionality which improves the operability and/or the security of the overall system.

A first, simple type of authentication media in general comprises an interface to exchange meta information with the reader and a memory means to store authentication data to be processed within the logic of, or interconnected to the reader based on at least one specific authentication rule. The authentication rule may be stored in the authentication media and/or a different device, such as the reader or a permanently or non-permanently interconnected host to control the reader and/or the authentication media. The authentication data and/ or the authentication rule may be designed to have an expiry condition, such as a expiry date or limited number of use, after which at least one of them changes their behavior. If appropriate the first authentication media may be virtualized.

In the authentication system according to the present invention a second authentication media of a meta-class type is foreseen. This new meta authentication media e.g. differs from the first authentication media in that it is of a more generic level or nature, e.g. suitable to assemble and carry information or data of different authentication levels (of a generic level), e.g. different first authentication media, and of different kind, which is necessary to control the derivation of a third authentication media (application authentication media) of a lower level. Depending on the field of application, the third authentication media in general is a authentication media of a lower level carrying information and application data on a user level, e.g. such as access control to specific facilities. Whereby the data structure of the application data may be received from a meta authentication media, the content itself may be received from a different device.

Therefore the meta authentication media may comprise different memory means or memory areas to store information in an encrypted (e.g. triple DES) and/or non-encrypted manner in memory means. To achieve the generic level the meta authentication media is foreseen to store authentication data of at least one first authentication media as described above, information about a data structure of a third authentication media, and/or information about authentication rules, data and/or information to operate a logic, e.g. an operating system of a reader, to derive at least one third authentication media of a lower authentication level. The meta authentication media in general also comprises at least one interface to exchange information with the reader. If appropriate it may further comprise a logic to process information and an internal and/or means to interconnect an external power supply, e.g. a RF-field generated by the reader. The meta authentication media may be designed to act as a carrier between different applications and systems, resp. cells, branches and/or levels of a hierarchical authentication system. This offers the advantage to avoid problematic interconnections such as wiring. The meta authentication media is designed to save hold and if appropriate process data not inherent to standard authentication media or incompatible to them. Thereby it becomes possible to achieve a high security level compared to other systems and still maintaining the ease of application. Furthermore it becomes possible to at least partially substitute or re-allocate certain elements and/or functions of a host based authentication system. Depending on the field of application the meta authentication media may be embodied as a smart card or credit card, either non-contact or contact, a USB-Stick, a Smart Phone, a cellular phone with appropriate interfaces or any other kind of portable physical device (hardware).

In an embodiment of the invention the meta authentication media comprises authentication rules by which the logic of the reader controls the derivation of a further second media, whereby the information necessary to derive the second meta media may be received at least partially from a host interconnected to the reader or calculated based on a authentication rule in the reader and/or in the meta authentication media.

The meta authentication media may further be designed to unlock a reader (e.g. key exchange) or to interact with, e.g. update, the operating system of a reader or host, e.g. its authentication system, authentication rules or authentication data, based on information available within the meta authentication media which is transferred via a secure interface of the meta authentication media to an interface of the reader and/or received from a host interconnected to the reader.

The meta authentication media may further be used to transmit to and to store in a reader authentication rules, data and/or information of different applications, from different providers and/or levels respectively kind, at the same time respectively in a single process, thereby embedding or integrating the reader into an authentication system and linking the reader to media related to said authentication rules, data and/or information in an easy way.

In an embodiment of the invention the meta authentication media may comprise memory means to store log information about a first, a further second meta or a third authentication media derived from the meta authentication media and/or log information from a reader interconnected to the meta authentication media. This log information may then be transmitted and analyzed on a host. Alternative or in addition the log information may be processed by a logic of the meta authentication media. Furthermore it is possible to modify meta information by the host or if appropriate by the meta authentication media based on the log information received.

A normal authentication media in general is a hardware suitable to permanently or temporarily store meta information relevant for the operation of the authentication system. If appropriate an authentication media may be implemented, if appropriate, as virtualized hardware (virtual device), e.g. as a computer program, code, software or firmware stored, operated and/or executed in a processing unit of a host, a computer or a reader, or in different processing units, enabling and allowing interactions or handling in the same way as with a hardware.

Meta information in general comprises authentication rules, authentication data and/or information about application data structure. Authentication rules define the dependency, hierarchy and inherency of authentication data stored on different authentication media. The authentication rules may further control the integrity of application data stored on authentication media of different levels. Furthermore the authentication rules may further control the inherency and/or the integrity of the application data structure on application data stored on different authentication media. In addition, the authentication rules may restrict the use of an authentication media in that it is mandatory that a person which uses the authentication media identify himself, e.g. by a separate pin or biometric data such as finger print or iris scan, e.g. by interaction with a reader and/or a meta authentication media. If appropriate the authentication media may therefore comprise a sensor for biometric information such as a finger print reader or other input devices. Alternatively or in addition a sensor for biometric information may be interconnected to a host or a read write unit for the authentication media to be functionally interconnected to the authentication media. Authentication data in general comprises a secure key which may have a hierarchical structure according to which authorization in a authentication system may be controlled. The Authentication data may define the set of authentication rules to be processed in the logic. Application data structure defines the structure of application data on a specific application media in correlation with at least one authentication rule and/or at least one authentication data. The logic and/or memory means of the reader may be arranged in the reader or external interconnected to the reader. Furthermore it is possible to exchange information by wire (contact) or contactless, e.g. by Bluetooth or an other suitable protocol.

Meta information may also comprise application data and/or operating data. Operating data generally is related to the operating system, the authentication system, the authentication rules or any application. Operating data may be code executable on a processing unit or logic of a host, a computer or a reader, or parameters or setting defining the operation said processing unit or logic.

The herein described invention will be more fully understood from the detailed description of the given herein below and the accompanying drawings which should not be considered limiting to the invention described in the appended claims.

DETAILED DESCRIPTION OF THE EMBODIMENTS

Figure 1:
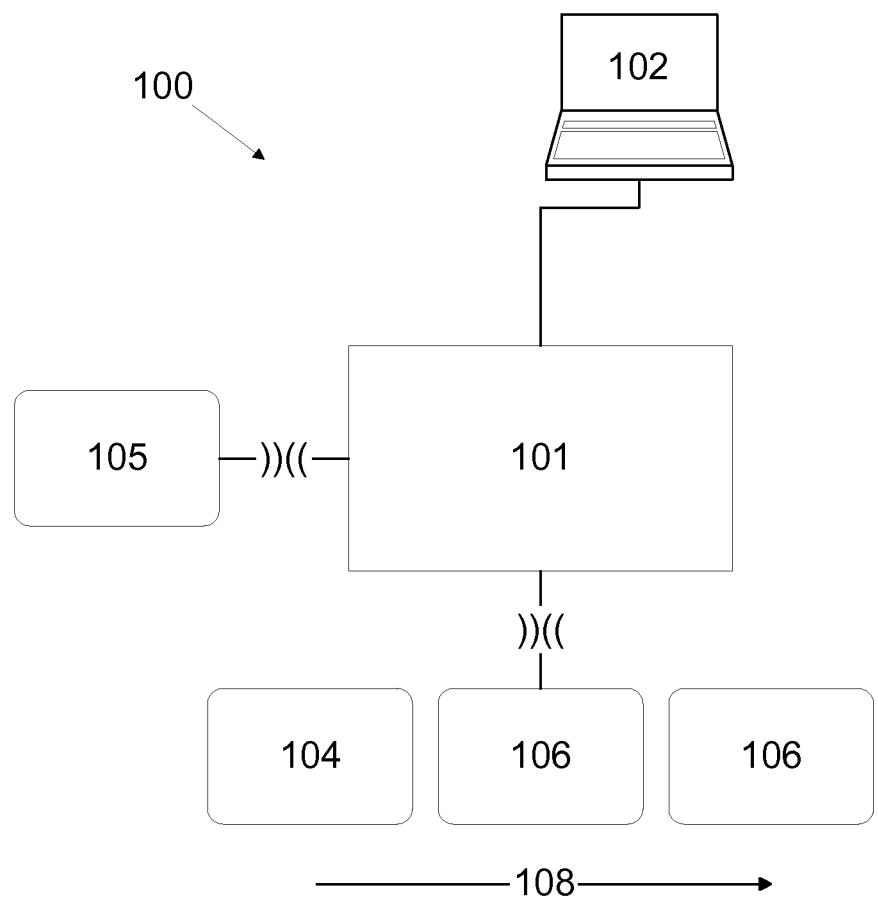
FIG. 1 shows a authentication system as known from prior art.

FIG. 1 shows an authentication system 100 according to the state of the art with different hierarchical and functional levels (authentication levels) and rules to operate the system. The authentication system 100 comprises a reader (read write unit) 101 and a host 102 interconnected to the reader 101. Interconnection which is normally wireless is schematically indicated by the symbol ")) ((" and normally takes place via corresponding interfaces of the reader and the authentication media. Interconnection which is normally made by wire is indicated by connection lines not specified in more detail.

By a first authentication media 105 of a higher authentication level, which comprises authentication data further authentication media 106 with derived authentication data (slave data) of a lower authentication level are made in that the first authentication media 105 is interconnected to the reader 101 and then authentication data of the first authentication media 105 is transmitted to the reader 101 wherein it is processed based on rules inherent to the reader or in exchange with information of the host 102. The reader 101 in general comprises a logic (not shown in detail) to process the authentication data received from the first authentication media 105 based on the authentication rules. Based on authentication rules further authentication media 106 of a lower level may be derived. In the host 102 derived instructions (master slave instructions) are generated or stored.

The derivation (production) of further authentication media 106 of a lower level is in general effected as follows: In the host 102 authentication rules or derived instructions are defined and exchanged with the reader 101. In that the first authentication media 105 is brought into interaction (schematically indicated by connection lines) with the reader 101, the reader 101 is activated such that further authentication media 106 can be derived by bringing media 104 into interaction with the reader 101. The authentication systems 100 allows to physically control the production (schematically indicated by arrow 108) of further authentication media 106 based on authentication data of a first authentication media 105 exchanged with the reader 101. The authentication media 105, 106 of the authentication systems 100 as known from prior art have in principle all a similar setup and configuration although they are of different authentication levels. Especially in the case when application data of different applications have to be united on a further authentication media 106 of a lower level, the making of such further authentication media 106 is in general relatively cumbersome.

Figure 2:
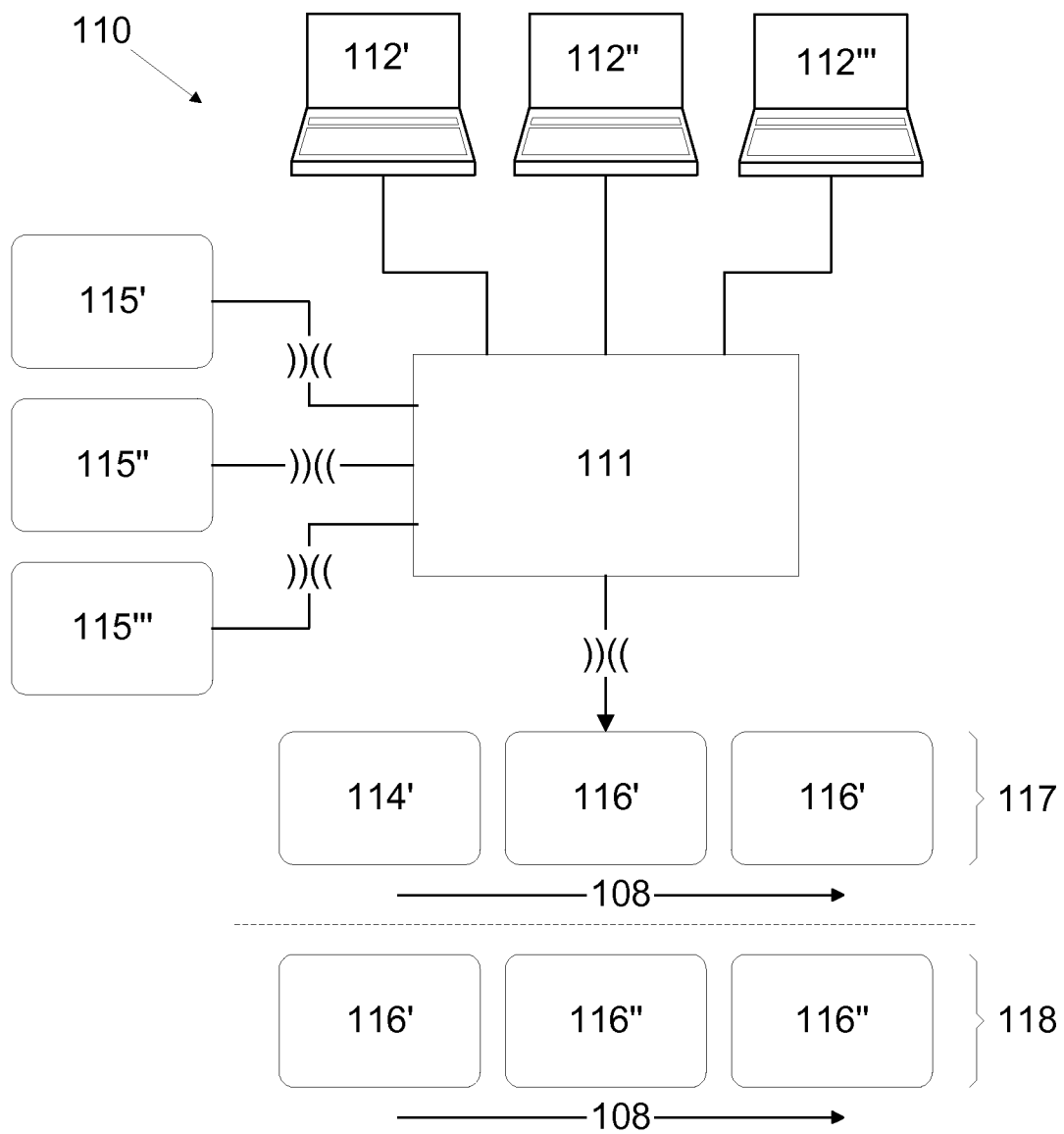
FIG. 2 shows a further authentication system as known from prior art.

FIG. 2 shows an authentication system 110 as known from the state of the art with different authentication levels and authentication rules for the making (schematically indicated by arrow 108) of further authentication media 116', 116" on user level comprising information e.g. to operate with different user applications, such as working hours or credit information for the coffee machine and the cafeteria. The authentication media 116' may comprise after a personalization process 108 information about an application data structure only (see first row 117) or application data 116" (see second row 118).

A further example as known from prior art is an application where several parties—schematically indicated by their hosts 112', 112", 112'" —would like to offer personalized authentication media 116', 116" on a user level. E.g. hotels of a ski resort, the operator of the local ski lifts, the operator of the local railway and the operator of the indoor swimming pool want to publish in collaboration with the tourist office on a user level a personalized tourist card in form of an application authentication media 116', 116" for the guests of the ski resort such that the guests can utilize the available facilities by the authentication media in a simplified manner.

The authentication system 110 therefore comprises a reader 111 suitable to operate according to system rules, several hosts 112', 112", 112, several first authentication media 115', 115", 115'" comprising different authentication data or information about how application data is structured (application data structure) on a further authentication media 116' of a lower level. It is known that third authentication media 116', 116" may comprise application file structures or application data of one or several applications. However to make such further authentication media 116', 116" is relatively cumbersome due to the fact that the hosts 112', 112", 112, and the several first authentication media 115', 115", 115'" have to be united and interconnected to the reader 111 at the moment the further authentication media 116', 116" are made. Authentication rules in the reader 111 control the compliance of the application data structures and/or application data with the associated authentication data and/or reader authentication data. In the different hosts 112', 112", 112'" different application data structures and/or application data are prepared and/or stored.

The making (initialization, personalization) of further authentication media 116', 116" comprising at least one application file structure 116' only (but not yet content in the form of application data stored in the application data structure) or comprising at least one application file structure and application data 116" for at least one application is made in general as follows: In the hosts 112', 112", 112'" application file structures and/or application data are defined and transmitted to a reader 111. In that a first authentication media is brought in interaction with the reader 111 authentication data is transmitted from authentication media 115' to the reader 111. The reader 111 process this information based on the authentication rules received from a host 112' such that a further authentication media 116' from a new media 114' is made. It is also possible to modify already existing further authentication media 116' in that further information is stored in the already existing authentication media 116".

Figure 3:
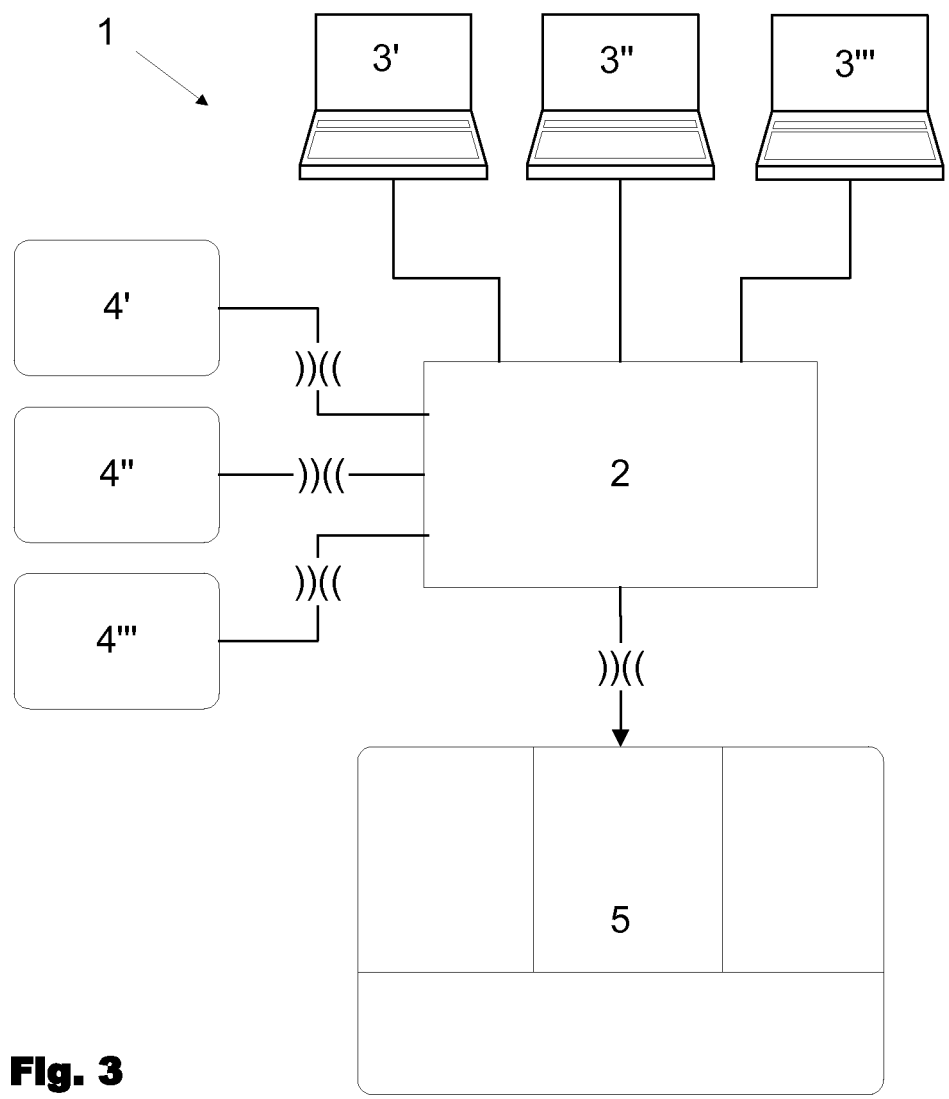
FIG. 3 shows a first part of an authentication system according to the invention.
Figure 4:
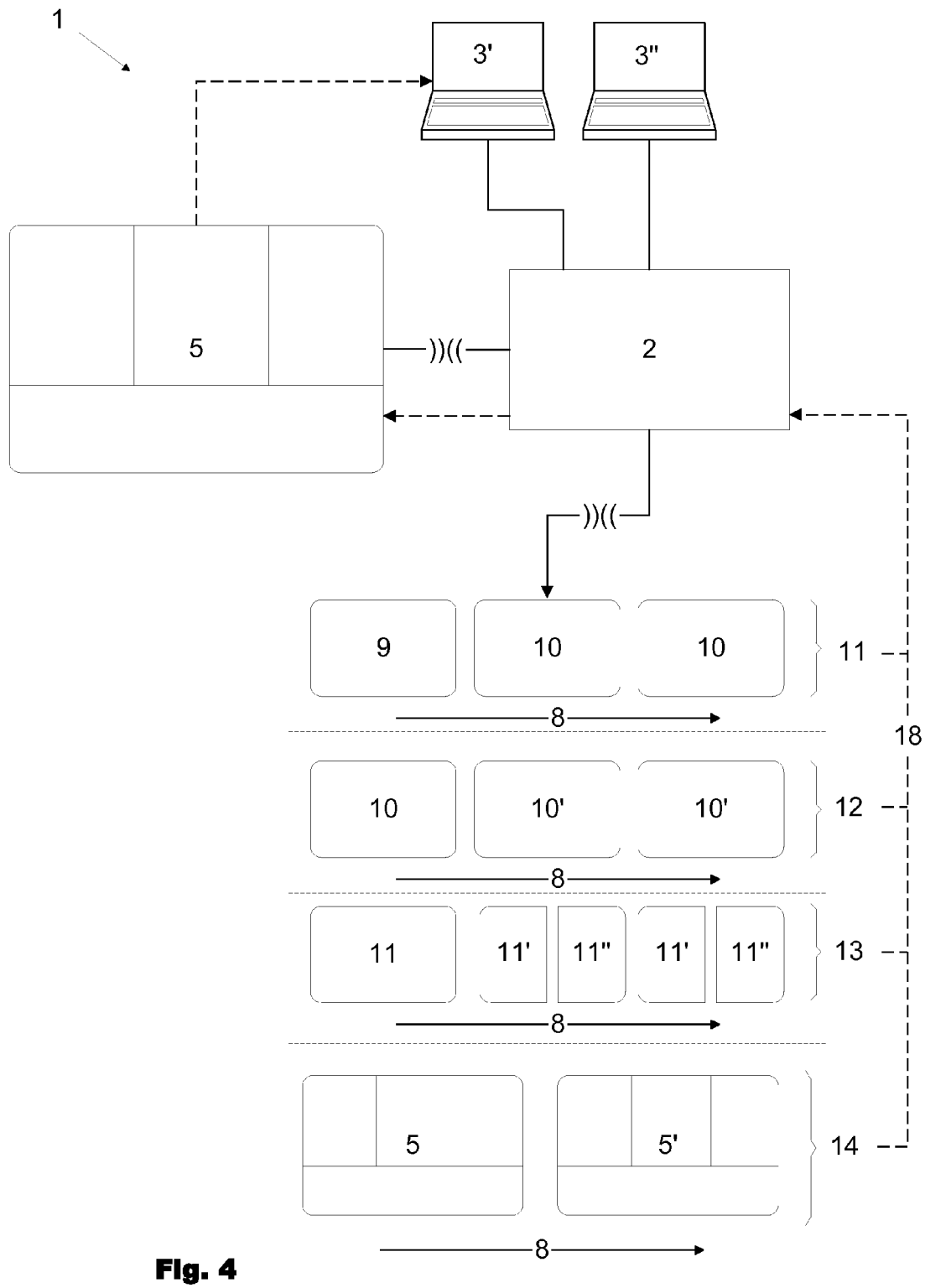
FIG. 4 shows a second part of an authentication system according to the invention.

FIG. 3 shows a first and FIG. 4 shows a second part of an authentication system 1 according to the present invention. The authentication system 1 comprises at least one reader (read/write unit) 2 interconnected to a logic (not shown in detail) to process authentication data based on authentication rules received from at least one host 3', 3", 3'" or the reader 2—as stored—and/or a first authentication media 4', 4", 4'". The authentication system 1 is suitable to handle several first authentication media 4', 4", 4'" comprising authentication data to be processed by the reader 2, information about an application data structure of or application data to be stored in a further authentication media (not visible here). Depending on the field of application the reader 2 may be operated stand alone, without permanent interconnection to the host 3', 3", 3'". The authentication system comprises at least one meta authentication media 5 which is made such that it is suitable to receive information of several host 3', 3", 3'" and/or first authentication media 4', 4", 4'" simultaneously or at different times. Information may be of different, independent providers and different from each other.

In FIG. 3 the making of a meta authentication media 5 is shown schematically and which differs from normal other authentication media as shown in the FIGS. 1 and 2 in that it is of a generic level suitable to assemble and carry generic information and of different kind. The meta authentication media 5 may act as a linking module (carrier) between different applications or cells of the authentication system and defining an association there between. The meta authentication media 5 may comprise different memory means to store information in an encrypted (e.g. triple DES) and/or non-encrypted manner and to completely separate different applications.

Depending on the field of applications the meta authentication media 5 is foreseen to store authentication data of at least one first authentication media 4', 4", 4'" and/or information about a data structure of a third authentication media (see FIG. 4) and/or information about authentication rules and/or information to operate the logic of the reader 2, such as an operating system or authentication rules or derived information to derive at least one third authentication media 10 of a lower authentication level compared to the first authentication media of a hierarchical authentication system. The meta authentication media 5 in general comprises at least one interface to exchange information with the reader 2. If appropriate it may further comprise a logic to process information and an internal and/or means to interconnect an external power supply, e.g. a RF-field generated by the reader 2. To initialize a meta authentication media 5 in general at least one first authentication media 4', 4", 4'" is brought into interaction with the reader 2 such that a logic interconnected to the reader receives information from the first authentication media which is processed by the logic interconnected to the reader based on system rules controlled by the first authentication media and/or the host. Then processed information is transmitted to the first authentication media 5 where it is stored in a specific memory means. The initialization process may happen in one go or in several steps by the same or a different reader 2.

While in FIG. 3 it is shown in a simplified manner how a meta authentication media 5 is generated by the interaction of different devices and systems, in FIG. 4 it is shown how a meta authentication media 5 is used to operate in an authentication system 1 comprising a reader 2 and to thereby derive as schematically indicated by arrows 8, third authentication media 10, 10', 11', 11". It is possible that the operating system and/or the authentication rules of the reader 2 are modified or the reader 2 is unlocked after the system has been installed. The meta authentication media 5 is suitable to at least partially substitute or replace the normally necessary host 3', 3" which significantly simplifies the making (personalization) of third authentication media of a lower level as schematically indicated in rows 11, 12, 13, 14. In FIG. 4 it is schematically shown how a third authentication media 10 is derived from a new media 9 (see row 11) and how third authentication media 10 is modified, e.g. in that further information regarding a different application is stored therein (see row 12), e.g. in that information is stored on the authentication media derived from the meta authentication media 10'. In addition it is shown how a further meta authentication media 5 is derived (see column 14). The meta authentication media 5 is designed to save hold and if appropriate process data not inherent to standard authentication media as shown in FIGS. 1 and 2. Thereby it becomes possible to achieve a high security level compared to other systems and still maintaining the ease of application. Furthermore it becomes possible to at least partially substitute and/or reallocate certain elements, resp. functions of a host based system. Information exchange between the media 5, 9, 10 and the reader 2 is preferably contactless, schematically indicated by the symbol "))((", e.g. by RF (Radio Frequency) in an ISM frequency band, NFC, Bluetooth or Wi-Fi. Alternative or in addition contact based exchange of information may be applicable. Information exchange between the hosts 3, 3', 3" and the reader 2 is in general wire based. Other combinations of contactless and/or contact information exchange are possible. The reader 2 is programmed to such that it is capable to handle authentication media of different type such as normal authentication media 9, 10 and meta authentication media 5.

As schematically displayed in row 13 it becomes furthermore possible to derive from an existing or a new authentication media 11 a new type of a split authentication media comprising a first and a second halve 11', 11" which act together as normal authentication media, e.g. on a user level but with the difference that only by the presentation of both split authentication media 11', 11" to a reader 2 simultaneously or one after the other during a certain period after each other a certain operation by a reader 2 and/or a host 3', 3" can be executed. Each halve 11', 11" of the split authentication media may comprise parts of application data, authentication data, authentication rules or other meta information which together allow to interact with the authentication system 1. E.g. in that each split authentication media 11', 11" is handed out to different person it becomes possible to increase the security of the authentication system.

The dashed arrow 18 schematically indicates the feedback of log information via a reader 2 to a meta authentication media 5 and if appropriate further on to a host 3'. The log information may provide a feedback about the number of authentication media derived from the meta authentication media 5, information about the status of the reader. If appropriate the log information may be processed by the meta authentication media itself, e.g. to update authentication rules of the reader 2 or other meta information inherent to the authentication system 1.

Figure 5:
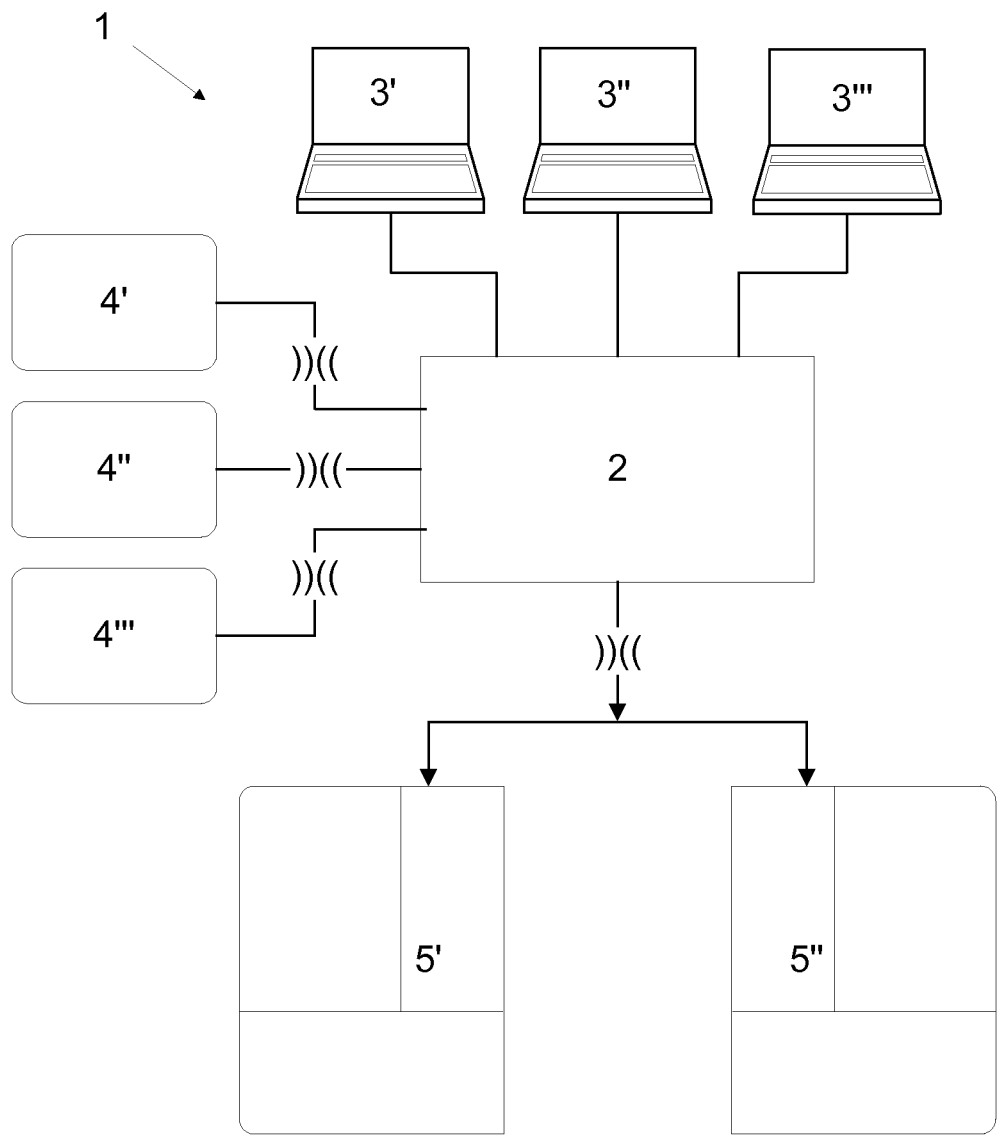
FIG. 5 shows a third part of an authentication system according to the invention.
Figure 6:
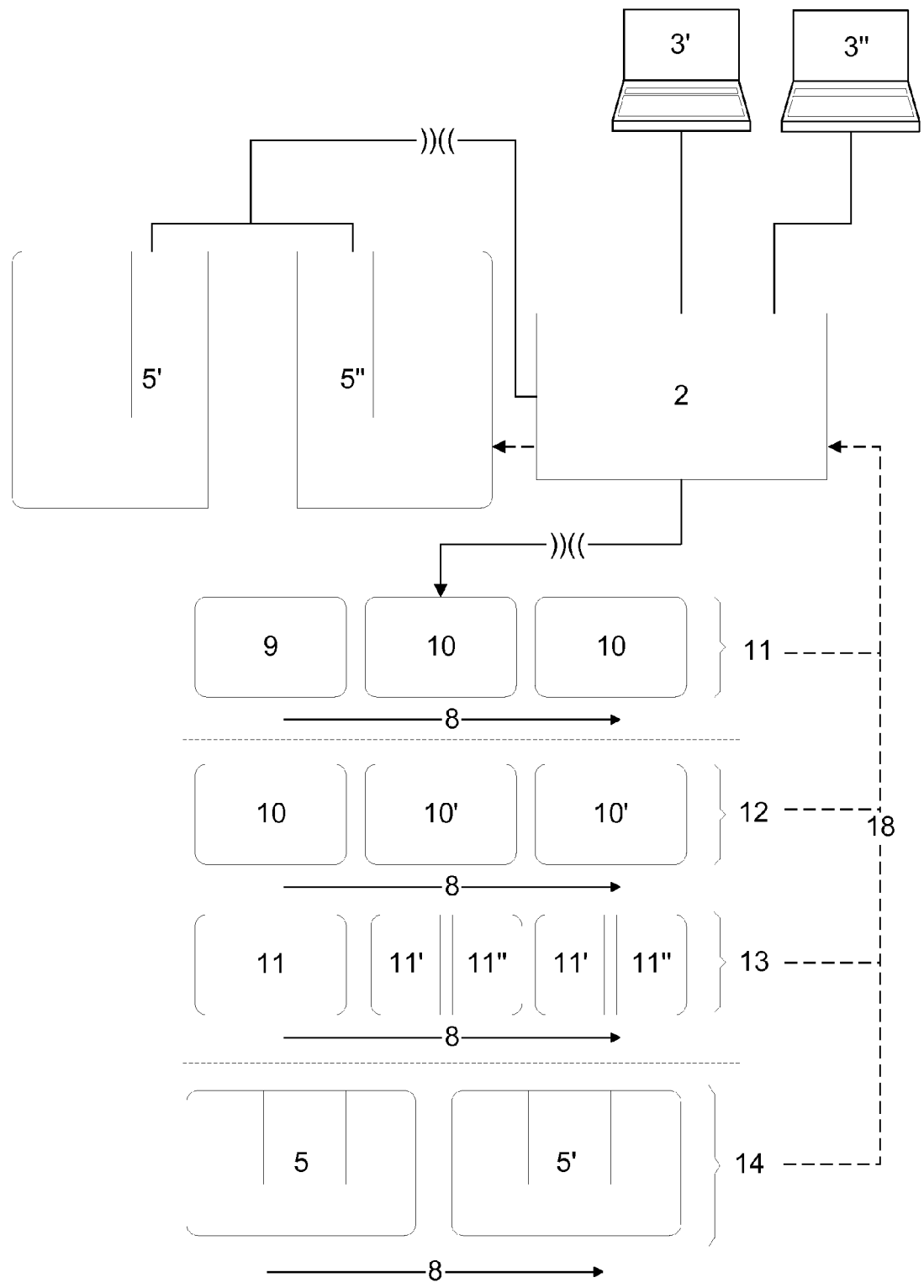
FIG. 6 shows a forth part of an authentication system according to the invention.

FIG. 5 and FIG. 6 show a further authentication system 1 according to the present invention in general similar to the authentication system 1 according to FIGS. 3 and 4. The meta authentication media 5 (see FIG. 3) of this embodiment is made as a split meta authentication media comprising a first and a second halve 5', 5". In that meta information normally belonging together to operate in an authentication system 1 according to the present invention is split apart and stored separately on a halve 5', 5" of a split meta authentication media the same operability and high security level may be achieved. With respect to the making of third authentication media as shown in rows 11, 12, 13, 14 reference is made to the description of FIGS. 3 and 4.

What is claimed is:

1. Authentication system comprising:
    a reader with at least one reader interface to exchange meta information with different authentication media,
    a logic unit, connected to the reader, and operable to process the meta information exchanged with different authentication media,
    at least one first authentication medium comprising a first interface to exchange meta information with the reader, the first authentication medium including a memory operable to store authentication data to be processed within the logic unit based on at least one specific authentication rule;
    a meta authentication medium for assembling and carrying information to control derivation of at least one third authentication medium of a lower authentication level than the at least one first authentication medium, the meta authentication medium further comprising:
        a second interface to exchange information with the reader, second memory means configured to store meta information based on authentication data received via the reader from several first authentication media, and to store information for operating the logic unit to derive the at least one third authentication medium of the lower authentication level based on the meta information.

2. Authentication system according to claim 1, wherein the second meta authentication medium further comprises authentication rules by which the logic unit interconnected to the reader derives a further meta authentication medium.

3. Authentication system according to claim 2, wherein the information to derive the further meta authentication medium is dispatched by a host interconnected to the reader.

4. Authentication system according to claim 1, wherein the meta authentication medium comprises third memory means to store log information about at least one of first and third authentication media derived therefrom via the reader.

5. Authentication system according to claim 1, wherein the meta authentication medium comprises means to update an operating system of the reader.

6. Authentication system according to claim 1, wherein the meta authentication medium comprises a second logic unit to process at least one of meta information and log information exchanged with the reader.

7. Authentication system according to claim 1, wherein the meta authentication medium is split and comprises a first and a second half.

8. Authentication system according to claim 1, wherein the meta authentication medium comprises a second logic unit to process information.

9. Authentication system according to claim 1, wherein the meta authentication medium is embodied in a credit card, a USB-Stick, a Smart Phone or a cellular phone.

10. Authentication system according to claim 1, wherein the meta authentication medium comprises information about a data structure of the third authentication media.

11. Meta authentication medium to be used in connection with an authentication system according to claim 1, wherein the meta authentication medium comprises:
    the second interface to exchange information with the reader and second memory means storing authentication data of at least one first authentication medium, information about a data structure of the third authentication medium and information about authentication rules to operate the logic unit connected to the reader in the authentication system.

12. Meta authentication medium according to claim 11, wherein the meta authentication medium comprises a third memory means to store log information about all authentication media derived therefrom.

13. Method to operate an authentication system comprising:
    a) Bringing at least one first authentication medium into interaction with a reader to exchange authentication data with the reader;
    b) Processing the authentication data within a logic unit interconnected to the reader based on specific authentication rules;
    c) Bringing a meta authentication medium into interaction with the reader to store the processed authentication data in a memory means of the meta authentication medium;

d) Repeating the steps a) to c) to store meta information comprising processed authentication data in the memory means of the meta authentication medium;
(e) Bringing the meta authentication medium in interaction with at least one of the same and a different reader to exchange the meta information contained within the memory means of the meta authentication medium;
(f) Processing the exchanged meta information within the logic unit interconnected to the reader based on specific authentication rules; and
(g) Bringing at least one third authentication medium into interaction with the reader to store the processed meta information received from the meta authentication medium within a memory means of the third authentication medium.

14. Method according to claim 13, wherein information about an application data structure of at least one of the third authentication medium and authentication rules to be processed in the reader are stored within the memory means of the meta authentication medium.

15. Method according to claim 13, wherein information received from the reader is processed within a logic unit of the meta authentication medium.

\* \* \* \* \*